US005150726A

United States Patent [19]

Rucker

[11] Patent Number: 5,150,726

[45] Date of Patent: Sep. 29, 1992

[54] METHOD AND APPARATUS FOR APPLICATION OF FINGER & TOENAIL COATINGS

[76] Inventor: Joie Rucker, P.O. Box 215, Sausalito, Calif. 94965

[21] Appl. No.: 591,423

[22] Filed: Oct. 1, 1990

Related U.S. Application Data

[62] Division of Ser. No. 166,395, Mar. 10, 1988, Pat. No. 4,960,587.

[51] Int. Cl.[5] ............ B32B 3/02

[52] U.S. Cl. ............ 132/285; 132/73; 132/319; 428/40; 428/343; 428/351; 428/911

[58] Field of Search ............ 428/343, 351, 40, 71, 428/15, 911, 61; 132/73, 319, 230, 285; 427/1, 4, 282

[56] References Cited

U.S. PATENT DOCUMENTS

| | | | |
|---|---|---|---|
| 1,716,336 | 6/1929 | Battistella | 132/73 |
| 2,031,225 | 2/1936 | O'Donnell | 132/73 |
| 2,162,155 | 6/1939 | Calvin | 132/73 |
| 2,220,363 | 11/1940 | Austin | 132/73 |
| 2,234,657 | 3/1941 | Smaldone | 132/73 |
| 2,239,040 | 4/1941 | Holmes | 132/73 |
| 2,288,386 | 6/1942 | Belden | 132/73 |
| 2,563,689 | 8/1951 | Muhlhauser | 132/73 |
| 2,581,982 | 1/1952 | Terry | 428/15 |
| 2,670,356 | 8/1952 | Lewis | 428/15 |
| 2,799,282 | 7/1957 | Slack | 132/285 |
| 3,645,835 | 2/1972 | Hodgson | 132/73 |
| 4,643,208 | 2/1987 | Amour | 132/73 |
| 4,690,369 | 9/1987 | Giuliano | 428/15 |
| 4,767,648 | 8/1988 | Hokama | 428/15 |

*Primary Examiner*—Jenna L. Davis
*Attorney, Agent, or Firm*—Robert R. Meads

[57] ABSTRACT

A method and apparatus for precisely and efficiently applying a coating to the nails of ones hands and toes and covering the cuticle and skin tissue bounding the nails to prevent coating from being applied thereto and to precisely define the area of coating applied to the nails. An adhesive backed mask is provided for covering the cuticle and skin tissue which has a cut-out portion for framing the nail to be coated. A plurality of masks are provided in a booklet and are removable therefrom for use, preferably by tearing a mask from a page of the booklet with a portion of the page on which it is adhered.

9 Claims, 1 Drawing Sheet

METHOD AND APPARATUS FOR APPLICATION OF FINGER & TOENAIL COATINGS

This is a divisional of co-pending application Ser. No. 07/166,395 filed on Mar. 10, 1988 now U.S. Pat. No. 4,960,587.

FIELD OF THE INVENTION

The invention relates generally to the field of cosmetics for beautifying ones appearance and is specifically directed to an apparatus and method for improving the application of a coloring material, such as a nail enamel, to ones finger and toenails.

BACKGROUND

It has become a custom for people throughout the world, and in particular women, to coat their fingernails with a protective or cosmetic material. The coatings include such materials as enamels or lacquers which are commonly referred to as nail polish or nail enamel. These materials most often have a select color or surface texture which is useful in providing a cosmetic appearance to the hand. The coating may be transparent however to simply provide a protective covering for the fingernail reducing the possibility of breaking, chipping or other similar damage.

Application of a fingernail coating is normally accomplished with a brush or similar applicator. The applicator should apply the coating evenly without leaving imperfections or markings. It is also necessary for the applicator to control application of the coating so that a well-defined edge of coating material may be formed where the fingernail is bounded by the skin tissue of the finger, i.e., the cuticle.

Even with a properly designed applicator, it is a difficult task to apply smooth, well-defined coatings to ones own fingernails. This task is particularly difficult in those situations where a right handed person wishes to coat a fingernail on her right hand by using the applicator with her left hand, and vice versa. Only those few who are ambidextrous become comfortable and proficient in use of the applicator with either hand. Most do not and the results of such difficulties are often a poor quality surface finish on the fingernail coating, mistaken application of coating material to the cuticle and flesh surrounding the fingernail, or both.

Removal of an unsatisfactory fingernail coating can be as difficult, or more so, than properly applying the coating to the fingernail in the first place. Time is of the essence in that it is much easier to remove coating material before it dries. Accurate and complete removal of excess or unwanted coating material without damaging the finished fingernail coating is very difficult. Even if accomplished accurately, it may not be possible to remove all of the unwanted coating from the cuticle and flesh areas surrounding the fingernail. A residue may remain or the coating may stain the cuticle or flesh.

Furthermore, it may be necessary to utilize a chemical solvent to satisfactorily remove unwanted overages of coating material. These are generally known as coating or polish removers, in that they are utilized to remove coating material from the fingernail, cuticle and flesh area surrounding the fingernail. If one wishes to completely remove an unsatisfactory coating from a fingernail, the chemical solvent may be freely applied to the nail and the coating rubbed off with a towel, cottonball or other absorbent material. If one wishes to only remove unwanted coating material from a cuticle leaving in tact the coating on the associated nail, special care needs to be taken to only contact the cuticle with the solvent since use of the solvent near the fingernail coating may adversely affect the surface finish or coloring of the coating as well as its marginal edge. Such care takes patience and time, commodities generally in short supply. In short, the clean-up procedure for one hand could easily be more troublesome and take a much longer time than to apply a coating to the fingernails of that hand.

Moreover, the use of chemical solvents to remove unwanted coating from the cuticle and surrounding skin tissue is not good for them, and can in fact harm them because it generally removes natural oils drying the finger skin and cuticle tissue. This can result in a reduction in the rate of growth of the fingernail below that which is normal, and cause the fingernail to become brittle and weakened permitting more easy breakage.

Thus, a need is presented for a method for easily and quickly applying a coating to ones own fingernails which eliminates problems associated with control of the application to define a percise edge of coating material along the boundary of the fingernail formed by its surrounding cuticle and skin tissue. Additionally, apparatus for performing this method in an efficient and inexpensive manner, and which reduces the required proficiency and dexterity in applying a coating to ones own fingernails, will provide a substantial benefit to those plagued with the foregoing problems. Similar needs exist for improved methods of applying coatings to ones toenails. The present invention is also directed to and provides solutions for such problems.

SUMMARY OF THE INVENTION

A method and apparatus are presented which accomplish rapid and easy application of a coating to ones fingernails and/or toenails with accurate formation of a precise edge of coating material adjacent to the boundary of the nail formed by surrounding cuticle and skin tissue of the finger or toe. The method comprises application of a selectively shaped mask over the cuticle and skin tissue surrounding the fingernail or toenail prior to application of the coating. After the coating is applied to the nail and sufficiently dried, the mask material is removed leaving a perfectly formed area of coating on the nail, thus eliminating any clean-up procedures and concerns of detrimental effects that may result from such procedures. The used mask is then disposed of.

The mask is composed of a sheet of pliable material which is coated on one side with an adhesive adapted to adhere to the cuticle and skin tissue of ones finger or toe. Both the pliable material and the adhesive material are impervious to passage of coating material. The pliability of the material is such that it may be formed accurately around the boundary of the nail as desired by the user to define the area of the nail to receive the coating.

The mask is shaped with a substantially U-shaped portion for covering the skin tissue around the nail, having a substantially U-shaped cut-out portion removed to expose the nail when the mask is applied. The size and shape of the U-shaped cut-out may vary to size the mask to varying size and shape finger and/or toenails.

A number of masks are provided for a user in a booklet, resembling in shape and configuration a matchbook. The booklet has a number of pages made of a release-type backing paper, and has a cover portion for enclosing the pages. Each page in the booklet has a certain number of preformed masks adhered to the release type backing paper of which the page is made so that individual masks may be pealed from the page for application. When all the masks of a page have been removed, the page may be torn from the booklet presenting a new page of backing paper full of unused masks. Alternatively, the page may contain crossing lines of perforation dividing the individual masks so that a mask with the portion of the page to which it is adhered may be torn from the remainder of the page held in the book. This permits removal of the page portion from the mask at a later time so that the adheisve on the backside of the mask is protected. The number of masks held on each page of backing paper and the number of pages of backing paper is determined according to the size desired for the booklet.

The method and apparatus of the present invention make possible fast and easy application of nail coating material, reduce the time necessary for completion of the nail coating process by eliminating any clean-up procedures, and protect the nail, cuticle and surrounding tissue from the coating material and from chemical solvents often necessary in a clean-up procedure. The coating may be applied to the nail with either hand without inordinate dexterity. Use of the method and apparatus may also result in reduced frequency of nail coating due to the fact that coating material may be precisely applied closer to the cuticle. This increases longevity since separation between the applied nail coating and the cuticle will not be apparent as early as the nail grows. The cost of nail care may also be reduced due to the elimination of a need for ancillary products utilized in clean-up procedures and health-care products required to prevent or repair damage to cuticle and skin tissue.

DESCRIPTION OF THE BEST MODE

Figure 1:
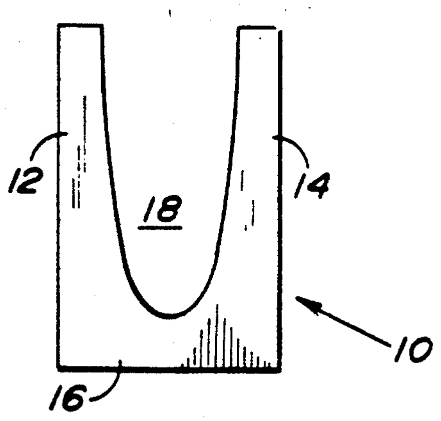
FIG. 1 is a frontal view of a mask for use in applying coating to a fingernail with the method described herein.

A method for applying a coating to ones fingernails is presented which utilizes a mask to border, cover and protect the cuticle and skin tissue of the finger surrounding the fingernail. As shown in FIG. 1, the mask 10 comprises an elastic and formable material configured to provide a protective covering for the cuticle and skin tissue of the finger surrounding the fingernail. The mask comprises side sections, 12 and 14 respectively, and a bottom section 16 which, when applied to the finger around the fingernail, prevents application of coating material to the cuticle and skin tissue of the finger surrounding the fingernail. A substantially U-shaped opening 18 is defined in the mask 10 to approximate the outward shape of the fingernail. The mask may be provided with the U-shaped opening 18 defined or with an insert of material from which the mask is made included which insert has been cut from the body of the mask, such as by standard die cutting practices.

The material of which the mask 10 is made possesses an elastic character so that the mask may be accurately formed around the cuticle and skin tissue surrounding the fingernail. The material may be a plastic or composite material such as that from which a typical band-aid is constructed. The elasticity of the material permits the user to selectively and precisely define the area of the fingernail surface on which coating will be applied. The material is characterized with a color contrasting with the flesh coloring of the finger skin tissue. The contrasting coloring aids in the positioning of the mask 10 to cover the cuticle and skin tissue of the finger without encroaching the surface of the fingernail to be coated. Additionally, the material of which the mask 10 is made will not pass the coating material to be applied to the fingernail, thus preventing application of the coating material to parts of the finger covered with the mask.

One side of the mask 10 is coated with an adhesive which is adapted to hold the mask in place on the finger after it has been positioned and adhered thereto, and which prevents passage of coating material under the mask after it is set in place by applying pressure. The adhesive is a pressure sensitive type adhesive much the same as used on band-aid type products and possesses hypo-allergenic and non-toxic characteristics. The pressure sensitive adhesive permits the mask to be set in place with light adherence and then firmly positioned through application of pressure with another finger.

Figure 2:
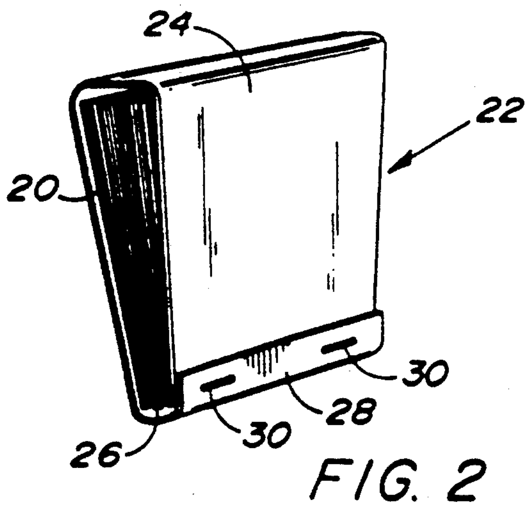
FIG. 2 is a perspective view of a booklet of masks for use in applying fingernail coatings with the cover of the booklet closed over the pages of the booklet holding the masks.

The side of the mask 10 having the adhesive coating is protected by a release type backing paper, which forms the pages 20 of a booklet 22 as shown in FIG. 2. The booklet 22 contains a number of pages 20 having masks 10 adhered to them. The general configuration of the booklet 22 is similar to that of a matchbook, which is common and well known. The booklet 22 comprises an overlapping cover 24 which encloses the pages 20 held within the booklet when the cover 24 is closed by inserting its extending edge 26 into a flap portion 28 formed at the bottom frontal area of the booklet. The booklet 22 is easily opened by sliding the cover 24 upwardly and bending the cover upwardly and over the top of the pages 20 contained in the booklet.

The pages 20 are serially arranged in the booklet 22 and attached within the booklet at their bottom parts by fastening means, such as staples 30. Preferably, the cover 24 of the booklet extends downwardly along the back side of the booklet and wraps around the bottom to form the flap portion 28. The pages 20 are inserted between the flap portion 28 and the backside of the cover 24, and stapled therebetween to fasten them within the booklet.

Each of the pages 20 made out of a release type backing material has a number of masks 10 adhered thereto. The number of masks 10 held by page 20 is determined by the size selected for the booklet 22 and the size of each of the individual masks 10. While the size of the booklet 22 is arbitrary, the masks 10 vary in shape and size to fit the shape and size of various persons fingers and fingernails. The width of the mask 10 may vary as well as the shape of the U-shaped opening 18 formed in the mask, so that the mask may be properly fitted to ones finger within the latitude of the elasticity possessed by the material from which the mask 10 is made. Thus, selection of the size and shape of the mask 10 to be held on an individual page 20 of the booklet 22 will determine the size of the booklet. Any select number of pages may be contained in the booklet 22.

Figure 3:
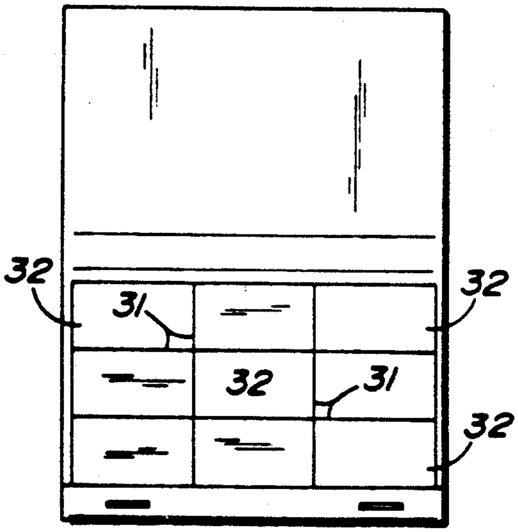
FIG. 3 is a frontal view of the booklet of FIG. 2 with the cover open exposing the first page of masks for removal by a user.
Figure 4:
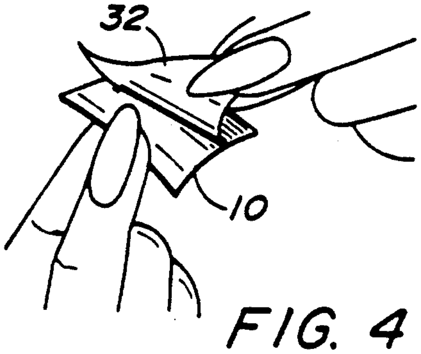
FIG. 4 depicts a step in the method of application of a coating to ones fingernail in which a mask is removed from the portion of the page made of backing paper to which it is adhered.

An individual mask 10 may be peeled from a page 20 for use in applying a coating to a fingernail. Once all of the masks 10 have been removed from a page 20, the page may be torn from the booklet 22 and discarded. Alternatively, each page 20 may be perforated by crossing lines of perforation 31 as shown in FIG. 3 and page portions 32 defined by the perforations individually removed with a mask 10 remaining attached. The mask 10 may be later peeled from the page portion 32 when use of the mask 10 is desired, leaving the adhesive on the back of the mask 10 protected in the interim. This permits removal of a mask 10 from a page 20 of the booklet 22 without exposing the adhesive on the backside of the mask 10 so that the mask may be retained separately from the booklet for later use.

Figure 5:
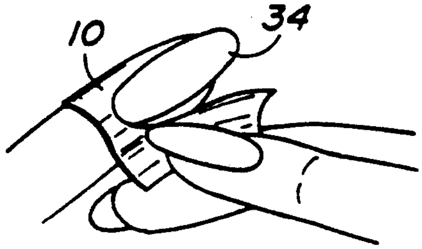
FIG. 5 depicts a step in the method of application of a coating to ones fingernail in which the mask is applied to the cuticle and skin tissue surrounding ones fingernail in preparation for application of a coating.
Figure 6:
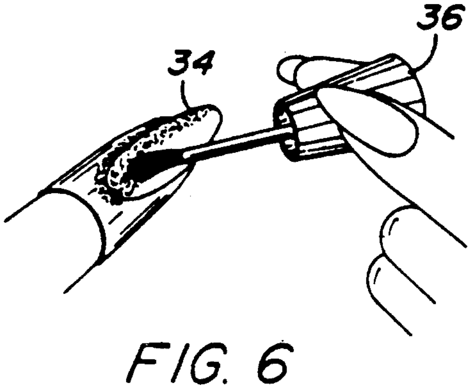
FIG. 6 depicts a step of the method in which a coating material is applied to the surface of the fingernail bounded by the mask to produce a smooth coating on a select area of the fingernail with a precisely defined edge.

Referring to FIGS. 4 through 7, the method presented for application of coating to ones fingernail(s) may be described. A mask 10 for protecting the finger cuticle and skin tissue surrounding the fingernail is provided in a booklet 22 as heretofore described. The mask is removed from the booklet in a manner as described above, either with a page portion 32 attached, or by peeling the mask 10 from a page 20. If the mask 10 is removed with the page portion acting as a backing, the page portion 32 is next peeled from the backside of a mask 10. Once a mask 10 is prepared for application having the adhesive on its backside exposed, as shown in FIG. 5 the mask is placed on the finger around the fingernail 34 in the desired location and arrangement relative to the fingernail so that the mask 10 covers the cuticle and skin tissue of the finger surrounding the fingernail. Such positioning of the mask is assisted by the elasticity of the material of which the mask 10 is made. The mask 10 is formed and stretched to exactly fit the border of the fingernail 34 for a precise fit defining the edge of coating to be applied to the fingernail. The mask 10 is then firmly pressed on the finger to provide a secure attachment and seal with the finger skin tissue and cuticle, defining the area of the fingernail 34 to receive a coating.

Once the mask 10 is securely applied to the finger, the coating is applied to the fingernail 34 with an applicator 36. The mask 10 defines the outer edge of the coating applied to the fingernail 34, with excess coating being received on the surface of the mask 10, which protects parts of the finger not to be coated.

Figure 7:
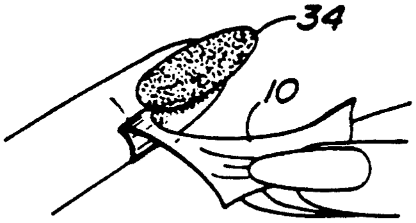
FIG. 7 depicts a step of the method in which the mask is removed from the finger leaving a perfectly formed coating on the fingernail.

After the coating is completely applied, it is allowed to dry, or partially dry. As shown in FIG. 7, the mask 10 is then removed from the finger leaving a percisely outlined coating on the fingernail without need for clean-up procedure. The excess over-brushed coating is removed with the mask 10 and discarded.

While a preferred form of the present invention has been described

While a perferred form of the present invention has been described in detail in the application of coatings to ones fingernails, it is to be understood that the present invention is useful in the application of coatings to ones toenails. Accordingly, the following claims defining the present invention have been drafted the invention to both applications.

I claim:

1. A booklet having a plurality of sheets of release type backing paper forming pages, each of said pages having a plurality of masks adhered thereto for use in application of a coating to a fingernail or toenail, each of said masks being individually removable said booklet and having an adhesive coated on the backside for application to cuticle and skin tissue of a finger or toe bounding the nail each of said masks comprising a flat U-shaped sheet of pliable, elastic and manually stretchable and formable synthetic resin material having opposing side means and base means between said side means for covering, sealing and protecting said cuticle and skin tissue and bounding a cut out open to a forward edge of said sheet and having a size and shape of said nail to expose said nail for coating while said elastic and stretchable side and base means are manually stretched and formed to cover said cuticle and skin tissue surrounding said nail with a marginal edge exactly fitting the border of said nail.

2. The booklet of claim 1 wherein said plurality of masks are cut from one another permitting removal of an individual mask from a page.

3. The booklet of claim 2 wherein said pages are perforated so that a portion of each page may be torn from the remainder of the page for removal of a mask from the page, said page portion providing a release-type backing for said adhesive coating on said mask to protect said coating, which may be removed when said mask is applied to a finger or toe.

4. The booklet of claim 2 wherein an individual mask may be peeled from said page of release type backing paper, for removal from said page.

5. The booklet of claim 1 wherein said booklet is constructed and configured to resemble the structure and configuration of a matchbook.

6. A mask for releasably covering, sealing and protecting the cuticle and immediately adjacent skin tissue of a person's finger or toe during application of a coating to an associated finger or toenail, the mask comprising a flat U-shaped sheet of pliable, elastic and manually stretchable and formable synthetic resin material having an adhesive coated on one surface thereof for releasably adhering said mask to said cuticle and skin tissue and said U-shaped mask including flat, elastic and manually stretchable and formable opposing side means and base means between said side means for covering, sealing and protecting said cuticle and skin tissue and bounding a cut out open to a forward edge of said sheet and having a size and shape of said nail to expose said nail for coating while said elastic and stretchable side and base means are manually stetched and formed to cover said cuticle and skin tissue surrounding said nail with a marginal edge exactly fitting a border of said nail.

7. A plurality of masks as claimed in claim 6, said masks adhered to a sheet of release-type backing material.

8. A plurality of masks as claimed in claim 7, a select number of said masks adhered to said sheet of release-type backing material and a plurality of said sheets of backing nmaterial forming pages of a booklet in which they are bound.

9. A plurality of masks as claimed in claim 8, wherein said booklet has a characteristic shape of a matchbook, said matchbook having a cover which extends around said pages, and provides means for binding said pages in said booklet.

* * * * *